United States Patent
Wei et al.

(10) Patent No.: US 10,404,338 B2
(45) Date of Patent: Sep. 3, 2019

(54) ENHANCED CSI PROCEDURES FOR FD-MIMO

(71) Applicant: QUALCOMM Incorporated, San Diego, CA (US)

(72) Inventors: Chao Wei, Beijing (CN); Yu Zhang, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/563,357

(22) PCT Filed: Jun. 3, 2015

(86) PCT No.: PCT/CN2015/080705
§ 371 (c)(1),
(2) Date: Sep. 29, 2017

(87) PCT Pub. No.: WO2016/183880
PCT Pub. Date: Nov. 24, 2016

(65) Prior Publication Data
US 2018/0083676 A1    Mar. 22, 2018

(30) Foreign Application Priority Data
May 15, 2015    (WO) ................ PCT/CN2015/079078

(51) Int. Cl.
| | |
|---|---|
| *H04B 7/04* | (2017.01) |
| *H04B 7/0456* | (2017.01) |
| *H04L 1/00* | (2006.01) |
| *H04B 7/06* | (2006.01) |
| *H04B 7/0452* | (2017.01) |

(52) U.S. Cl.
CPC ......... *H04B 7/0478* (2013.01); *H04B 7/0452* (2013.01); *H04B 7/0626* (2013.01);
(Continued)

(58) Field of Classification Search
CPC .......................... H04B 7/0478; H04B 7/0452; H04B 7/0626; H04L 1/0031
See application file for complete search history.

(56) References Cited

U.S. PATENT DOCUMENTS

2011/0235599 A1*  9/2011  Nam ................. H04L 1/0027
                                                 370/329
2015/0280801 A1* 10/2015  Xin .................. H04B 7/0478
                                                 370/329
2016/0329945 A1* 11/2016  Onggosanusi ...... H04B 7/0626

FOREIGN PATENT DOCUMENTS

| CN | 103107866 A | 5/2013 |
|----|-------------|--------|
| CN | 104396153 A | 3/2015 |

(Continued)

OTHER PUBLICATIONS

Alcatel-Lucent Shanghai Bell et al., "Considerations on CSI Feedback Enhancements for High-Priority Antenna Configurations", 3GPP Draft; R1-112420, 3rd Generation Partnership Project (3GPP), Mobile Competence Centre; 650, Route Des Lucioles; F-06921 Sophia-Antipolis Cedex, France, vol. Ran Wg1, no. Athens, Greece; Aug. 22, 2011, Aug. 18, 2011 (Aug. 18, 2011), XP050537814, [retrieved on Aug. 18, 2011].

(Continued)

*Primary Examiner* — Wei Zhao
(74) *Attorney, Agent, or Firm* — Norton Rose Fullbright

(57) ABSTRACT

Enhanced channel state information (CSI) procedures for full dimension-multiple input, multiple output (FD-MIMO) is discussed in which a number of CSI reference signal (CSI-RS) ports configured for a user equipment (UE) is determined. In response to the CSI-RS ports including both horizontal and vertical ports, the UE may determine a first precoding matrix from a plurality of precoding matrices constructed by a Kronecker product of a horizontal precoding matrix and a vertical precoding matrix. The UE selects (Continued)

a predetermined number of precoding vectors out of the first precoding matrix and generates a wideband precoding matrix, based on the selected predetermined number of precoding vectors. The UE reports one or more CSI reports, wherein the CSI re-ports includes at least one precoding matrix indicator (PMI) for the first precoding matrix and at least an indication of the selection of the predetermined number of precoding vectors.

16 Claims, 13 Drawing Sheets

(52) U.S. Cl.
CPC ......... *H04B 7/0632* (2013.01); *H04L 1/0031* (2013.01); *H04L 1/0026* (2013.01)

(56) References Cited

FOREIGN PATENT DOCUMENTS

| EP | 2863570 A1 | 4/2015 |
|----|----|----|
| WO | WO-2013024350 A2 | 2/2013 |
| WO | WO-2014033515 A1 | 3/2014 |
| WO | WO-2014059944 A1 | 4/2014 |

OTHER PUBLICATIONS

International Search Report and Written Opinion—PCT/CN2015/079078—ISA/EPO—Feb. 14, 2016.
International Search Report and Written Opinion—PCT/CN2015/080705—ISA/EPO—Feb. 14, 2016.
Qualcomm Incorporated: "CSI-RS and Feedback Enhancements Targeting 2D antenna", 3GPP Draft; R1-150482, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9, 2015-Feb. 13, 2015 Feb. 8, 2015, XP050933690, Retrieved from the Internet: URL:http://www.3gpp.org/ftp/Meetings_3GPP_SYNC/RAN1/Docs/, 3 pages.
Qualcomm Incorporated: "Elevation Beamforming and FD-MIMO with 2D Antenna Array", 3GPP Draft; R1-145087, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014 Nov. 17, 2014, XP050876121, Retrieved from the Internet: URL:http://www.3gpp.org/ftp/Meetings_3GPP_SYNC/RAN1/Docs/, 4 pages.
Supplementary European Search Report—EP15892259—Search Authority—Munich—Oct. 25, 2018.

\* cited by examiner

ENHANCED CSI PROCEDURES FOR FD-MIMO

The present application claims priority to PCT Application No. PCT/CN2015/079078, entitled, "ENHANCED CSI PROCEDURES FOR FD-MIMO." filed on May 15, 2015. Aspects of the present disclosure relate generally to wireless communication systems, and more particularly, to enhanced channel state information (CSI) procedures for full-dimensional multiple-input, multiple-output (MIMO) systems.

BACKGROUND

Field

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance communication technologies not only to meet the growing demand for mobile broadband access, but to advance and enhance the user experience with mobile communications.

SUMMARY

In one aspect of the disclosure, a method of wireless communication includes determining a number of channel state information reference signal (CSI-RS) ports configured for a UE, and, in response to the CSI-RS ports including both horizontal and vertical ports, determining a first precoding matrix from a plurality of precoding matrices, wherein the plurality of precoding matrices is constructed by a Kronecker product of a horizontal precoding matrix and a vertical precoding matrix, selecting a predetermined number of precoding vectors out of the plurality of precoding matrices of the first precoding matrix, generating a wideband precoding matrix, based on the selected predetermined number of precoding vectors, and reporting one or more channel state information (CSI) report, wherein the one or more CSI report includes at least one precoding matrix indicator (PMI) for the first precoding matrix and at least an indication of the selection of the predetermined number of precoding vectors.

In an additional aspect of the disclosure, an apparatus configured for wireless communication includes means for determining a number of CSI-RS ports configured for a UE, and, means, executable in response to the CSI-RS ports including both horizontal and vertical ports, for determining a first precoding matrix from a plurality of precoding matrices, wherein the plurality of precoding matrices is constructed by a Kronecker product of a horizontal precoding matrix and a vertical precoding matrix, for selecting a predetermined number of precoding vectors out of the plurality of precoding matrices of the first precoding matrix, for generating a wideband precoding matrix, based on the selected predetermined number of precoding vectors, and for reporting one or more CSI report, wherein the one or more CSI report includes at least one PMI for the first precoding matrix and at least an indication of the selection of the predetermined number of precoding vectors.

In an additional aspect of the disclosure, a non-transitory computer-readable medium having program code recorded thereon. The program code further includes code to determine a number of CSI-RS ports configured for a UE, and, code, executable in response to the CSI-RS ports including both horizontal and vertical ports, to determine a first precoding matrix from a plurality of precoding matrices, wherein the plurality of precoding matrices is constructed by a Kronecker product of a horizontal precoding matrix and a vertical precoding matrix, to select a predetermined number of precoding vectors out of the plurality of precoding matrices of the first precoding matrix, to generate a wideband precoding matrix, based on the selected predetermined number of precoding vectors, and to report one or more CSI report, wherein the one or more CSI report includes at least one PMI for the first precoding matrix and at least an indication of the selection of the predetermined number of precoding vectors.

In an additional aspect of the disclosure, an apparatus configured for wireless communication is disclosed. The apparatus includes at least one processor, and a memory coupled to the processor. The processor is configured to determine a number of CSI-RS ports configured for a UE, and, in response to the CSI-RS ports including both horizontal and vertical ports, further configuration of the at least one processor to determine a first precoding matrix from a plurality of precoding matrices, wherein the plurality of preceding matrices is constructed by a Kronecker product of a horizontal precoding matrix and a vertical precoding matrix, to select a predetermined number of preceding vectors out of the plurality of precoding matrices of the first precoding matrix, to generate a wideband precoding matrix, based on the selected predetermined number of precoding vectors, and to report one or more CSI report, wherein the one or more CSI report includes at least one PMI for the first precoding matrix and at least an indication of the selection of the predetermined number of precoding vectors.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA. TDMA, FDMA, OFDMA, SC-FDMA and other networks.

The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA). Ultra Mobile Broadband (UMB), IEEE 802.11 (Wi-Fi). IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
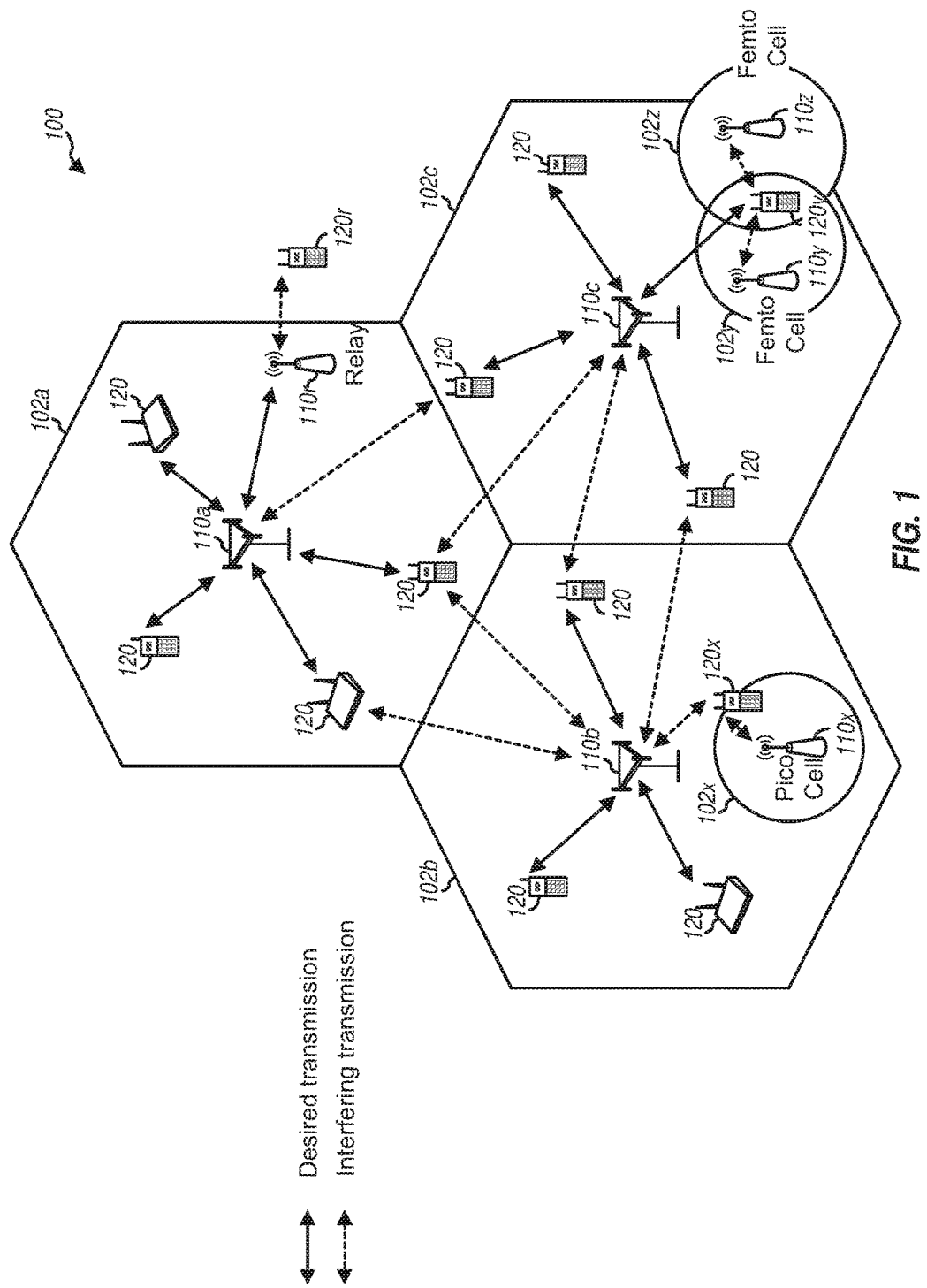
FIG. 1 is a block diagram illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a. 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG). UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the cNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a smart phone, a tablet, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz. and there may be 1, 2, 4, 8 or 16 subbands for system bandwidth of 1.25, 2.5, 5, 10 or 20 MHz, respectively.

Figure 2:
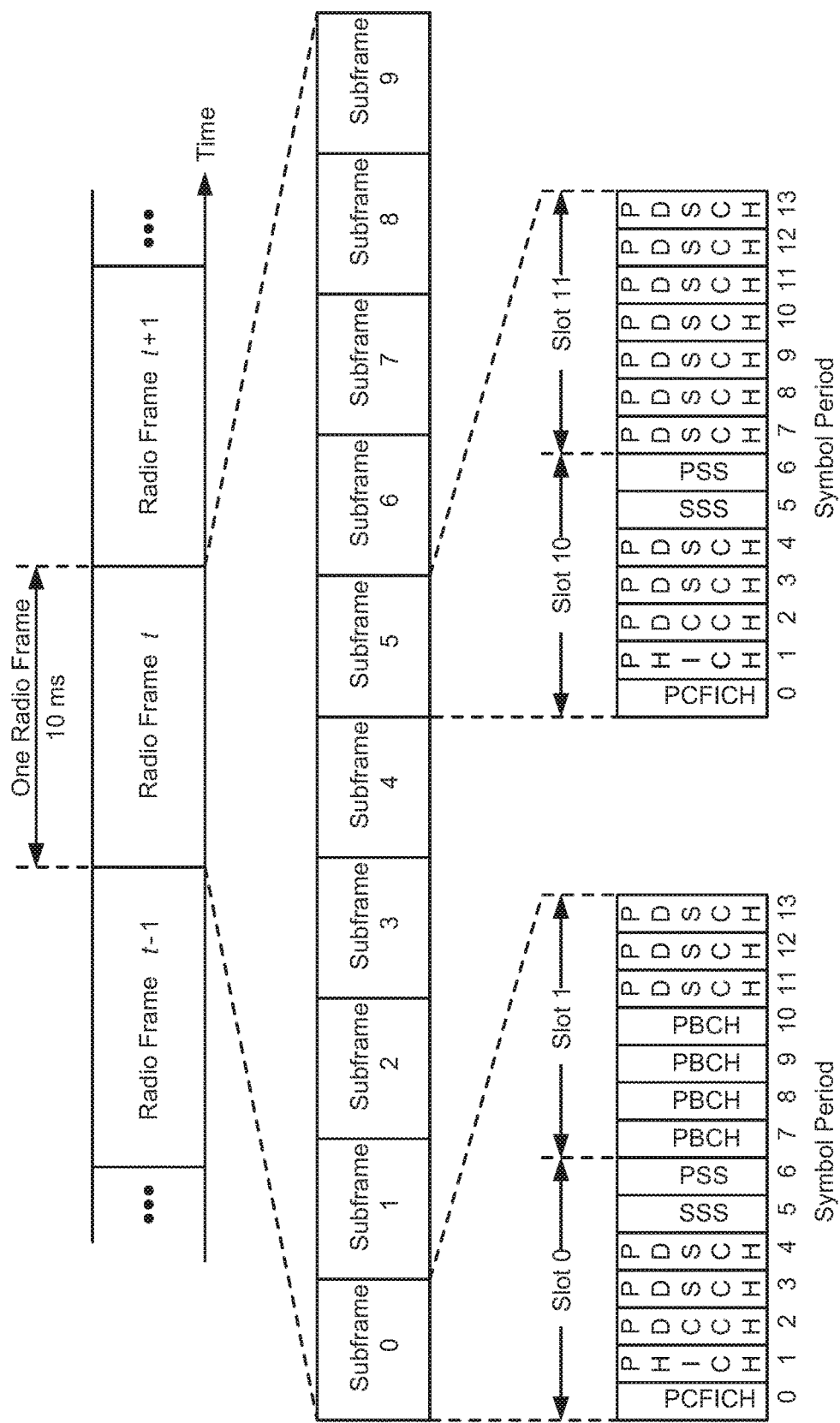
FIG. 2 is a block diagram illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS. SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS. SSS. PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
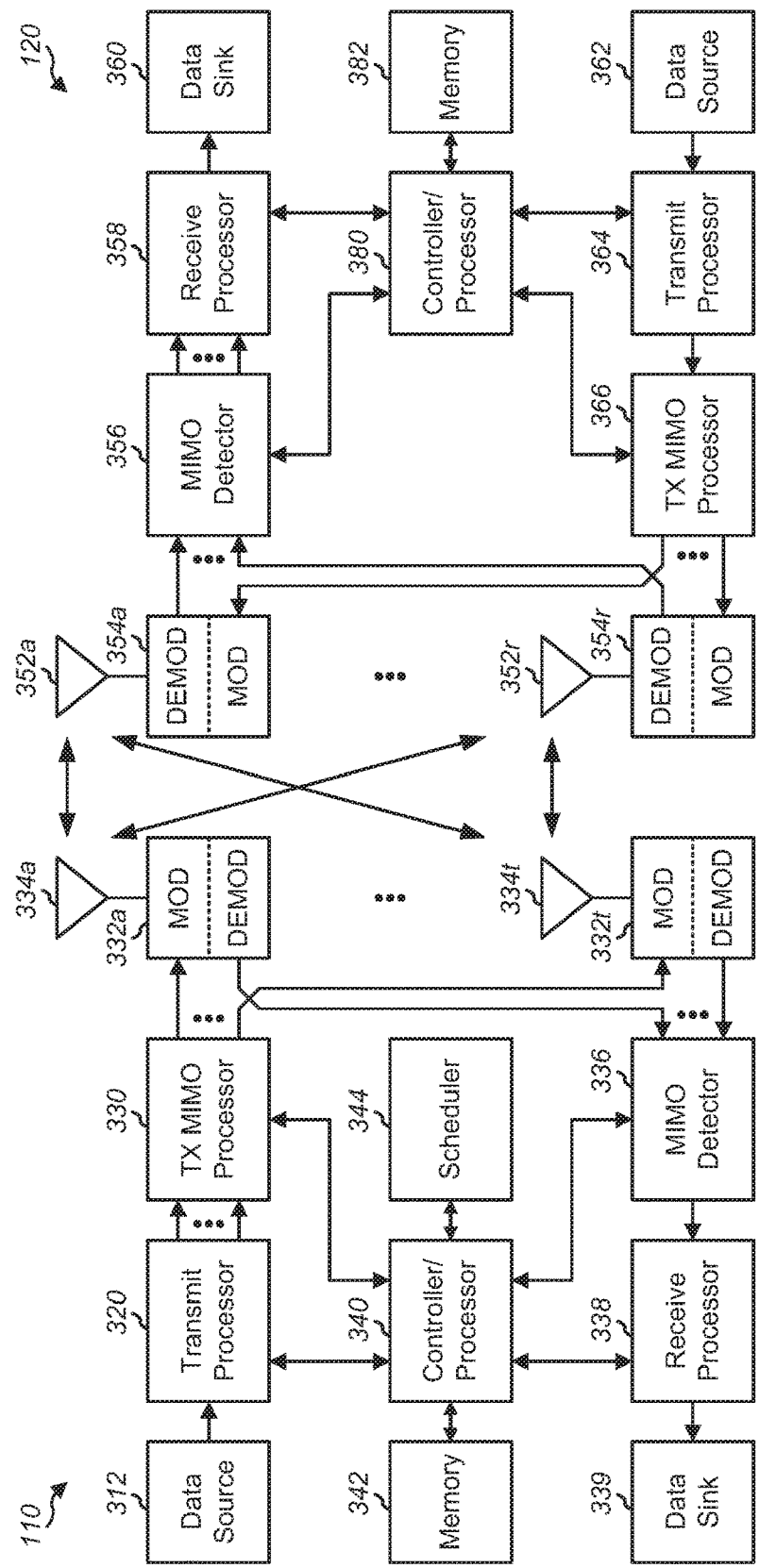
FIG. 3 is a block diagram illustrating a design of a base station and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH. PHICH. PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 5, 7, and 11, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Thus. FD-MIMO technologies may take advantage of both azimuth and elevation beamforming, which would greatly improve MIMO system capacity.

Figure 4:
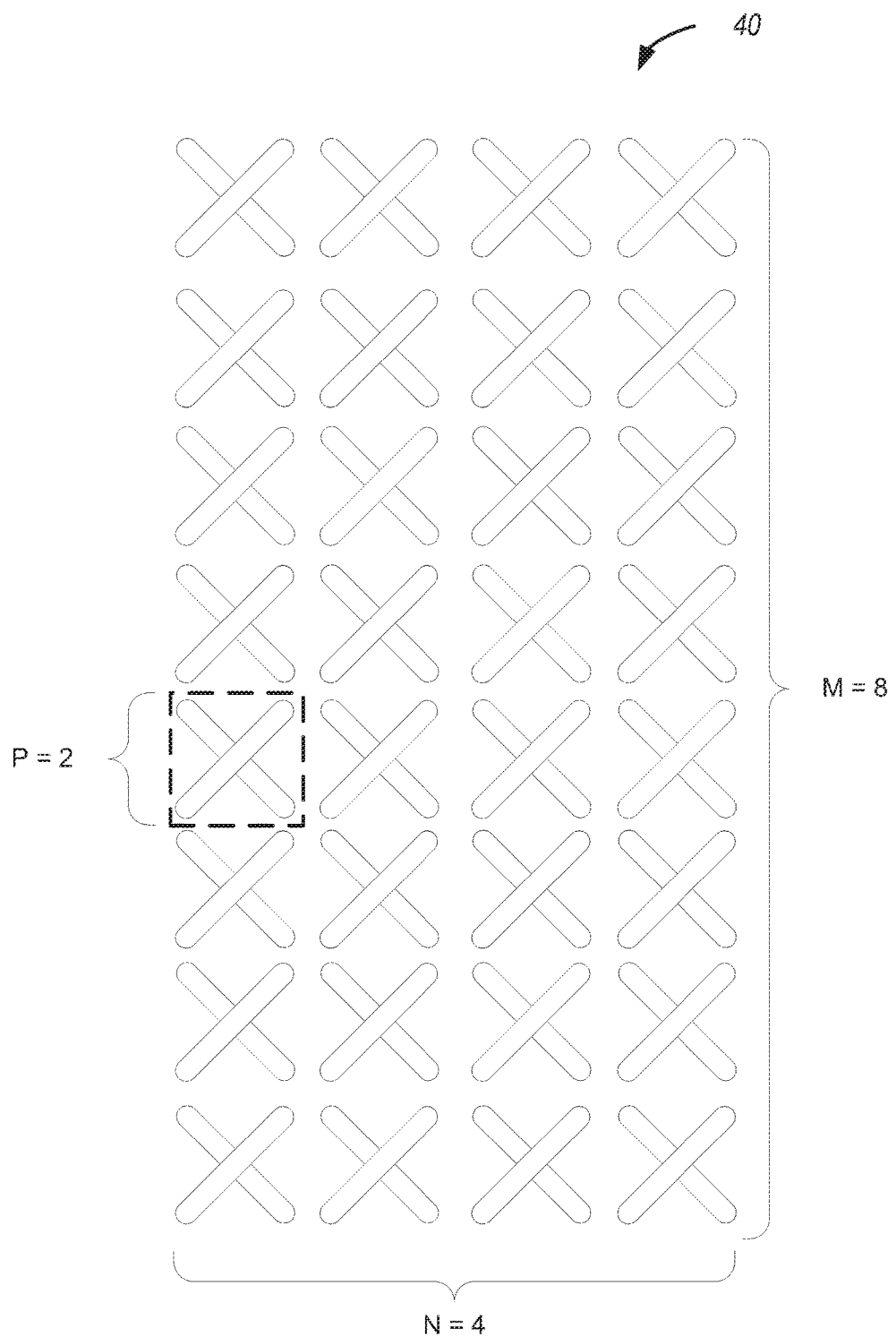
FIG. 4 is block diagram of an exemplary two-dimensional active antenna array.

FIG. 4 is a block diagram illustrating a typical 2D active antenna array 40. Active antenna array 40 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 40 has four columns (N=4), with eight vertical (M=8) cross-polarized antenna elements (P=2).

For a 2D array structure, in order to exploit the vertical dimension by elevation beamforming the channel state information (CSI) is needed at the base station. The CSI, in terms of precoding matrix indicator (PMI) rank indicator (RI) and channel quality indicator (CQI), can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

CSI feedback schemes proposed for FD-MIMO can be generally classified into two main categories: (1) Non-precoded CSI-RS with a two-dimension codebook. (2) beamformed CSI-RS with cell specific elevation beamforming. In general, the non-precoded CSI-RS with a 2D codebook can provide the best performance but would greatly increase UE complexity. In comparison, beamformed CSI-RS would use explicit or implicit feedback of the CSI-RS beam index with less UE complexity.

One proposal for a precoding matrix/vector for CSI reporting uses a Kronecker product (KP)-based codebook structure for FD-MIMO which includes, for 2D codebook design, a dual codebook structure. The KP-based dual codebook structure is based on the relationship for the preceding matrix, W $$W=W_1 W_2,$$

where $W_1$ is the long-term, wideband precoding matrix and $W_2$ is the subband preceding matrix, which would be updated more frequently. The precoding matrix $W_1$ describes a grid of two-dimension beams according to the equation:

$$W_1 \begin{bmatrix} X_H^p \otimes X_V^q & 0 \\ 0 & X_H^p \otimes X_V^q \end{bmatrix} \quad (1)$$

where $$X_H^p \in \mathbb{C}_1^{M \times N_{b1}},$$

and $$X_V^q \in \mathbb{C}_2^{N \times N_{b2}}$$

represent a grid of adjacent discrete Fourier transform (DFT) beams for azimuth and elevation preceding, and $N_{b1}$ and $N_{b2}$ are the numbers of DFT beams per horizontal group and per vertical beam group, respectively. The $W_2$ preceding matrix performs beam selection from $W_1$ and cross-polarized co-phasing with the following alternative design options:

$$W_2 = W_H \otimes v \quad \text{Full KP:}$$

$$W_2 = (w_H^{(1)} \otimes v^{(1)} \ldots w_H^{(r)} \otimes v^{(r)}) \quad \text{Partial KP:}$$

For a KP-based codebook structure, the codebook size may be proportional to the product of the number of azimuth and elevation preceding vectors. For example, for 64 transmit antenna ports of 2D antenna array (8, 4, 2), there are sixteen $X_H$ matrices constructed from 32 horizontal preceding vectors: {0, 1, 2, 3}, {2, 3, 4, 5}, {4, 5, 6, 7}, ..., {28, 29, 30, 31}, {30, 31, 0, 1} and sixteen $X_V$ matrices constructed from 16 vertical precoding vectors: {0, 1}, {1, 2}. {2, 3}, ..., {14, 15}, {15, 0}. As a result, there are total 256 $W_1$ matrices. For $W_2$, if a distinct selection of beams per layer and/or per polarization is used, there would be four hypothesis for elevation beam selection from $X_V$ and sixteen hypotheses for azimuth beam selection from $X_H$ and x-pol co-phasing resulting in a total of 64 hypotheses for $W_2$.

The large codebook size, especially for $W_2$, would greatly increase UE complexity and may also require a large feedback overhead. For example, under the present description, 8-bits would be used for $W_1$ and 6-bits for $W_2$. However, the maximum PMI payload size for CSI reporting on PUCCH is 4-bits. For $W_1$ it may be possible to separately feedback the group selection of $X_H$ and $X_V$, e.g., $W_1$ determined from 2-subframe report. However. $W_2$ uses joint selection of vertical and horizontal beams based on short-term channel measurement. Thus, using a 2-subframe report for $W_2$ would degrade performance. In order to reduce $W_2$ overhead, it may be possible to limit the number of vertical DFT beams in $X_V$ to a single DFT beam, but this would not support subband-wise vertical PMI feedback. One approach is to perform subsampling of the codebook(s) for the subband precoder $W_2$ but a fixed subsampling used for all the subbands would degrade the performance.

Aspects of the present disclosure are directed to a down-sampling of the 2D-DFT beams in the wideband precoder $W_1$. In other words, $W_1$ is designed to contain a k-element beamformer taken from 2D-DFT based precoder vectors according to the equation:

$$W_1 \begin{bmatrix} G^{(k,N_b)} & 0 \\ 0 & G^{(k,N_b)} \end{bmatrix} \quad (2)$$

where, $G(k, N_b)$ represents a reduced DFT matrix of k-column subsets of the full $N_b$ column KP structure precoding matrix $$G^{(N_b)} = X_H^p \otimes X_V^q$$

where, $$X_H^p \in \mathbb{C}_1^{M \times N_{b1}}, \text{ and}$$

$$X_v^q \in \mathbb{C}_2^{N \times N_{b2}}$$

with $$N_b = N_{b1} \times N_{b2}$$

In other words, the columns of the reduced DFT matrix $G(k, N_b)$ are selected from a 2D-DFT matrix given by $X_H^p \otimes X_V^q$.

Figure 5:
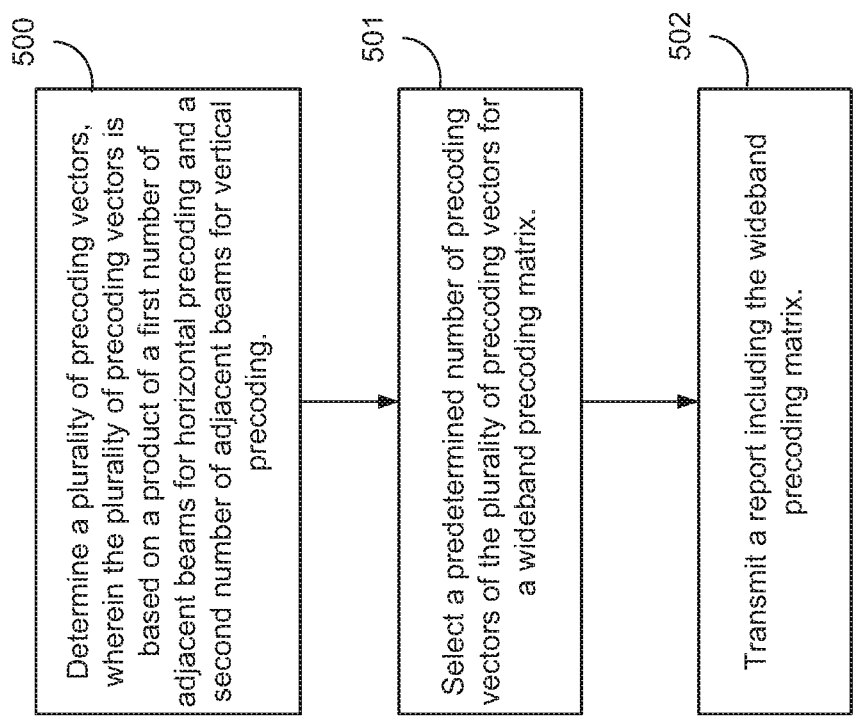
FIG. 5 is a block diagram illustrating example blocks executed to implement one aspect of the present disclosure.

FIG. 5 is a block diagram illustrating example blocks executed to implement one aspect of the present disclosure. At block 500, a first precoding matrix is determined from a plurality of preceding matrices, wherein the plurality of preceding matrices is constructed by the Kronecker product of a horizontal preceding matrix and a vertical preceding matrix. For example, the plurality of preceding vectors include the KP structure precoding matrix $G^{(N_b)}$.

At block 501, a predetermined number of precoding vectors are selected out of the plurality of the preceding vectors of the first precoding matrix. The predetermined number, k, represents the reduced number of columns for selection to the k-element beamformer.

At block 502, a wideband preceding matrix is generated based on the selected plurality of precoding vectors. The UE will select k columns from the full KP structure preceding matrix, $G^{(Nb)}$, to form the wideband precoding matrix $W_1$. At block 503, the UE reports one or more CSI reports to the base station, wherein the CSI reports include at least one PMI for the first precoding matrix and at least an indication of the selection of the plurality precoding vectors.

Figure 6A:
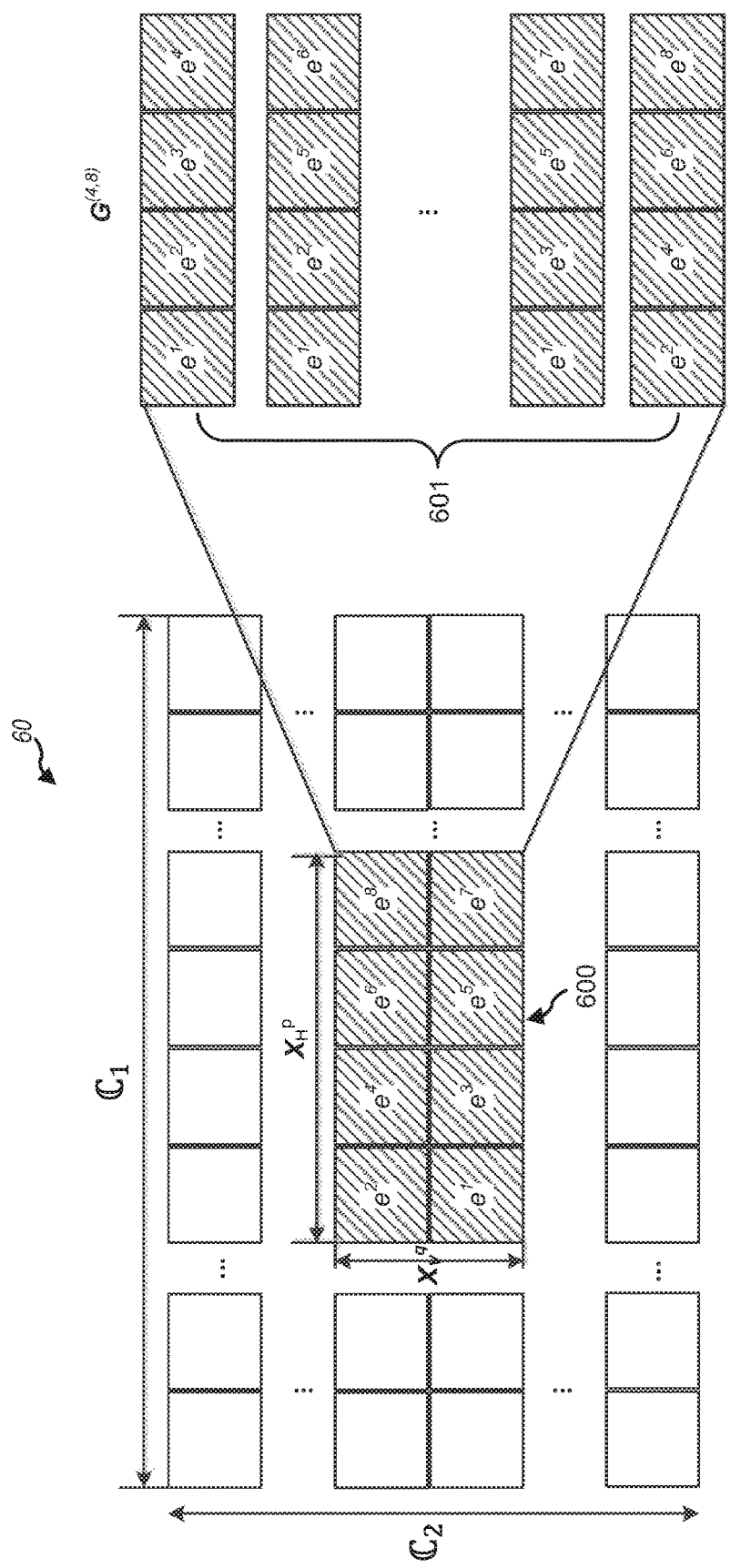
FIGS. 6A-6C are block diagrams illustrating a k-element beamformer configured according to aspects of the present disclosure.

FIG. 6A is a block diagram illustrating a k-element beamformer 601 configured according to one aspect of the present disclosure. For purposes of the illustrated example, KP structure DFT matrix 60 is a $G^{(8)}$ grid of eight 2D-DFT beams constructed from two adjacent vertical DFT beams and four adjacent horizontal DFT beams. One column of KP structure DFT matrix 60. $G^{(8)}$, is a Kronecker product of two DFT beams or vectors, one for vertical precoding and the other for horizontal precoding. e.g., $u_{pi} \otimes v_{qj}$ with i=1 . . . 4 and j=1 . . . 2, and reduced DFT matrix. $G^{(4,8)}$ 600, performs dimension reduction of the KP structure DFT matrix 60, $G^{(8)}$, e.g., selecting four columns from total eight columns.

In one example aspect, the reduced DFT matrix, $G^{(4,8)}$ 600, selects one of eight predefined column pair combinations 601, e.g., $(e_1, e_2, e_3, e_4)$, $(e_1, e_2, e_5, e_6)$, $(e_1, e_2, e_7, e_8)$, $(e_3, e_4, e_5, e_6)$, $(e_3, e_4, e_7, e_8)$, $(e_5, e_6, e_7, e_8)$, $(e_1, e_3, e_5, e_7)$, and $(e_2, e_4, e_6, e_8)$, where $e_j$ indicates the selection of the jth column from KP structure DFT matrix 60, defined by $G^{(8)} = X_H^p \otimes X_V^q$, where $X_H^p \in \mathbb{C}_1^{M \times N_{b1}}$ and $X_V^q \in \mathbb{C}_2^{N \times N_{b2}}$ are a grid of beam codebook.

The first six column selection hypotheses of pair combinations 601 create four 2D-DFT beams with different elevation preceding vectors while the last two column selection hypotheses of pair combinations 601 use the same elevation DFT preceding vector for all four of selected DFT beams.

Figure 6B:
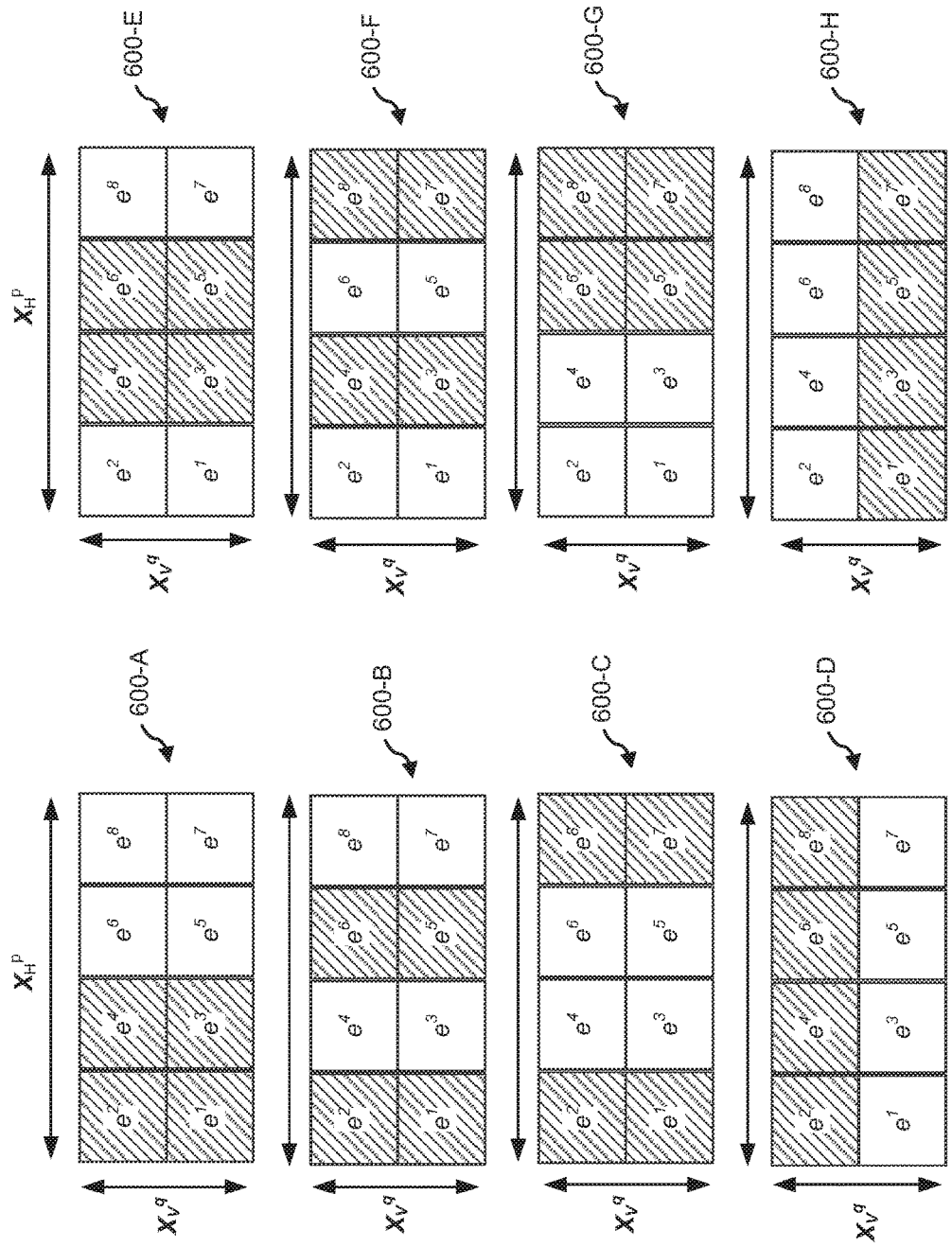

FIG. 6B is a block diagram illustrating example reduced DFT matrices, $G^{(4,8)}$ 600-A-600-H configured according to aspects of the present disclosure. In the illustrated aspects, only one dimension DFT beam is down-sampled by a factor of two, e.g., either $X_V^q$ or $X_H^p$ are down-sampled, wherein the down-sampled elements are represented without cross-hatching, and the reduced DFT matrix, $G^{(4,8)}$ 600 can still be represented by a Kronecker product of a vertical precoding matrix with a small number of beams and a horizontal preceding matrix with a small number of beams.

Figure 6C:
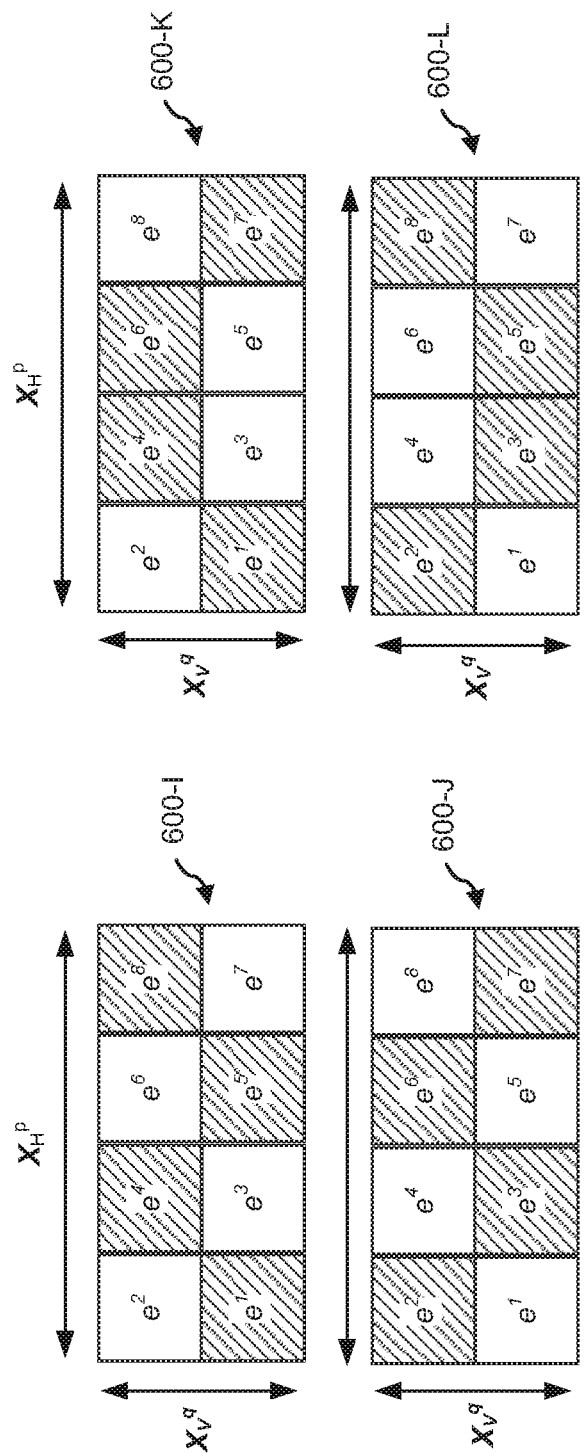

FIG. 6C is a block diagram illustrating example reduced DFT matrices, $G^{(4,8)}$ 600-I-600-L configured according to aspects of the present disclosure. In the illustrated aspects, the reduced DFT matrices, $G^{(4,8)}$ 600-I-600-L select four beams of the full DFT matrix $G^{(8)}$ so that the reduced DFT matrices, $G^{(4,8)}$ 600-I-600-L cannot be represented by a Kronecker product of a vertical precoding matrix of and a horizontal preceding matrix, but each column of the reduced DFT matrices, $G^{(4,8)}$ 600-I-600-L are a Kronecker product of two DFT vectors corresponding to vertical and horizontal precoding.

In another example aspect, the k-element column selection jointly performed with the wideband beam group selection of $X_H^p$ and $X_V^q$. In other words, the wideband preceding matrix $W_1$ selection is divided to two steps, e.g., firstly selecting a group with a larger number of DFT beams, and then down select a subgroup with only k-elements. The first group contains KP type 2D-DFT based preceding vectors. The wideband preceding matrix $W_1$ will contain a k-element beamformer, wherein each beamformer may be a Kronecker product of two DFT vectors, one for vertical and the other for horizontal preceding but the $W_1$ may not have the KP structure. The first and second group selection for the wideband preceding matrix $W_1$ can be separately or jointly encoded and fed back. If separate feedback is used, different reporting rates can be used. The value of k-elements can be either fixed or semi-statically configured by higher layer signaling. If k is equal to $N_b$ it means there is no wideband column selection in $W_1$ and a large codebook size used for $W_2$.

Figure 7:
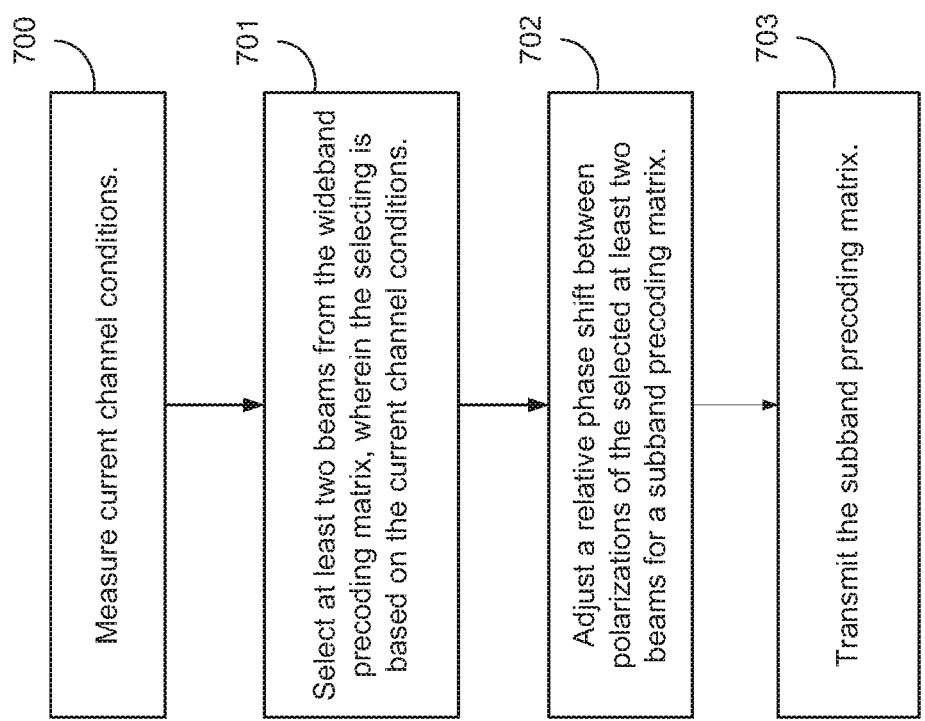
FIG. 7 is a block diagram illustrating example blocks executed to implement one aspect of the present disclosure.

FIG. 7 is a block diagram illustrating example blocks executed to implement one aspect of the present disclosure. The example blocks illustrate an operation for generating the subband precoder, $W_2$. At block 700, a UE measures the current channel conditions. The subband precoder $W_2$ is influence by short term channel measurements and, therefore, is updated more frequently than wideband precoding matrix, $W_1$.

At block 701, the UE selects one or more beams from the k-element wideband preceding matrix, $W_1$, based on the rank, wherein the selecting is based on the current channel conditions, and, at block 702, the UE adjusts a relative phase shift between polarizations of the selected beams for a subband preceding matrix. At least for the $G^{(4,Nb)}$ case, the $W_2$ for a Rel-10 eight transmitter (8Tx) could be reused, e.g., for Rank 1, four selection hypotheses and four QPSK co-phasing hypotheses yield 16 codebooks for $W_2$, while for Rank 2, eight selection hypotheses and two QPSK co-phasing hypotheses also yields 16 codebooks for $W_2$. In both cases, only four bits per subband would be needed for $W_2$. UE complexity is greatly reduced due to the smaller number of codebooks for $W_2$. Furthermore, only one PMI is reported for $W_2$ instead of two separate H-PMI and V-PMI which are used for KP type $W_2$ codebook.

Further reduction of feedback overhead for $W_2$ can be considered also by using different feedback granularity for vertical beam selection and horizontal beam selection since it shall be possible the selection of vertical preceding is common for all the subbands. At least for the $G^{(4,Nb)}$ case, if the 4 beams in $W_1$ are associated with two different vertical preceding vectors, there are at least two and four vertical preceding hypotheses for rank 1 and rank 2 respectively, dependent on whether same or different vertical precoding is used for all the layers. Therefore, the beam selection for $W_2$ can be divided into two steps. e.g. first selecting a vertical preceding hypothesis and then selecting the horizontal preceding beams for a given vertical precoding hypothesis. The selection of the horizontal preceding beams can be wideband and subband. In such case, the selection of vertical preceding hypothesis for all the subbands for $W_2$ can also be combined with the selection of the wideband preceding matrix $W_1$. More specially, the selection of wideband preceding matrix $W_1$ represents a grid of 2D-DFT beams, e.g., 8 beams constructed from two DFT vectors for vertical preceding and four DFT vectors for horizontal preceding. The selection of the vertical preceding hypothesis for all the subbands determines whether the same or vertical preceding vectors are used for all the layers for high rank transmission or for each polarization, e.g., based on one of four vertical precoding hypotheses using two DFT vectors. The selection of the vertical preceding hypothesis for all the subbands is then used to restrict the codebook set for $W_2$, e.g., using 16 codebooks instead of 64 codebooks for $W_2$.

Compared to KP based $W_1$ and $W_2$ codebooks, the various aspects of the present disclosure having a k-element KP structure beamformer that offers several advantages. For example, the various aspects of the present disclosure may offer a considerable dimension reduction for wideband preceding matrix $W_1$, thus, allowing a smaller codebook for the subband precoder $W_2$. The column selection is divided into wideband and subband operations which provides a trade-off between complexity and performance. Uplink control indicator (UCI) overhead may also be reduced and PMI reporting simplified for $W_2$ by reusing existing CSI feedback mode, e.g., max 4-bits for $W_2$ reporting.

For beamformed CSI-RS based schemes, the UE measures one or multiple elevation beamformed CSI-RS resources, indicates selection of one or multiple resource, and then reports one or multiple CSI(s) corresponding to the selected CSI-RS resources. Beamformed CSI-RS based schemes may not efficiently support layer-specific or polarization specific CSI-RS beam index selection per subband due to potentially larger feedback overhead. For example, in a 4 beamformed CSI-RS resource system, this may cause feedback of another 4 bits for the beam index selection indication for ranks 1 and 2, in addition to the subband PMI/CQI. Another issue arises regarding support for CQI only CSI feedback mode or transmit diversity (TxD) CQI reporting for beamformed CSI-RS based schemes. Currently TxD CQI is only supported for a CSI process with 2 or 4 CSI-RS ports.

The proposed solution for non-precoded CSI-RS may also be extended to the beamformed CSI-RS based schemes. In such aspects, a UE may feedback a wideband CSI-RS beam index selection bitmap to indicate one or multiple selected CSI-RS resources. For each selected CSI-RS resource, a wideband precoding matrix $W_1$ may be reported, where $W_1$ represents a grid of DFT beams for horizontal precoding. It may also be possible that the wideband precoding matrix $W_1$ for multiple CSI-RS resources are jointly determined so that only one common $W_1$ is reported. The wideband precoding matrix $W_1$ describes a grid of azimuth beamforming DFT beams associated with one beamformed CSI-RS resource, and the selected CSI-RS resources indicate multiple possible elevation beamforming precoders.

Figure 8:
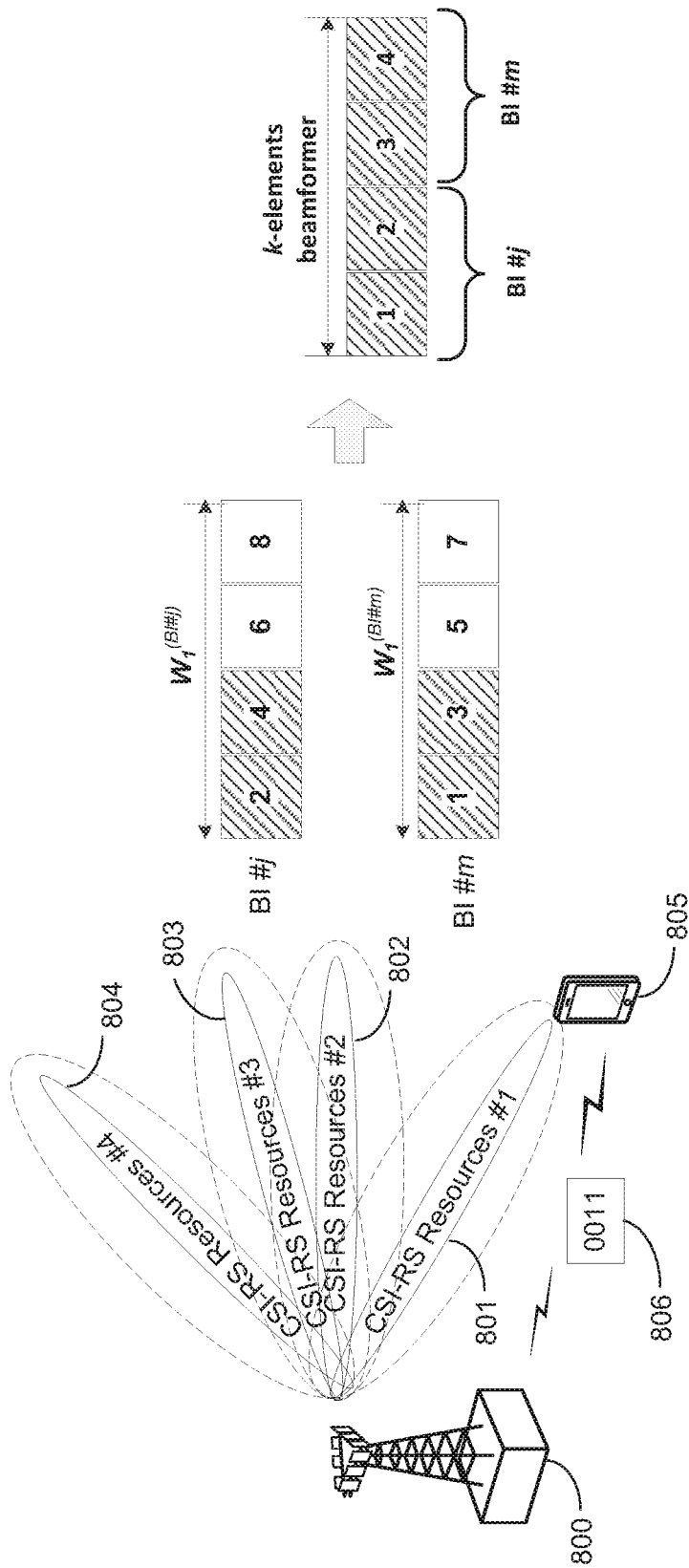
FIG. 8 is a block diagram illustrating a base station and a UE configured according to one aspect of the present disclosure.

FIG. 8 is a block diagram illustrating base station 800 and UE 805 configured according to one aspect of the present disclosure. Base station 800 may operate a beamformed CSI-RS based CSI scheme transmitting multiple CSI-RS resources, such as CSI-RS resources 801-804. UE 805 measures long-term channel quality of CSI-RS resources 801-804 and selects the better quality CSI-RS resources for reporting the short-term channel state information and precoding. UE 805 transmits a bitmap 806 which indicates the one or more CSI-RS resources of CSI-RS resources 801-804 have been selected based on the long-term channel quality. With the bit mapped '0011', UE 805 indicates selection of CSI-RS resources 801 and 802. For each of the selected CSI-RS resources, UE 805 determines a wideband preceding matrix which represents of a grid of beams of DFT based preceding vectors, either jointly or separately based on long-term channel properties of the associated CSI-RS resources.

In one example aspect, the wideband preceding matrix $W_1$ of multiple selected CSI-RS resources may be aggregated into a larger preceding matrix and wideband column selection may be used to down-select a k-element beamformer. As one example, the first and second columns of the wideband precoding matrices associated with the CSI-RS resource BI #j and BI #m are selected to construct a subsampled wideband precoding matrix with a 4-element beamformers. The subband precoding matrix $W_2$ may further perform beam selection from the k-element beamformer, and then perform quantized co-phasing between two polarization groups. In another example, if k is equal to 4, then, for a rank 1 preceding there may be four selection hypotheses and four co-phasing hypotheses for a subband preceding resulting in a total of 16 codebook hypotheses for $W_2$ subband preceding. Compared to the non-subsampling wideband precoding matrix the feedback overhead for $W_2$ can be greatly reduced. UE complexity is also reduced. It may also be possible to further reduce $W_2$ codebook feedback overhead by using different feedback granularity for CSI-RS resource selection and DFT beam selection in $W_2$ codebook. In other words, the finer selection of CSI-RS resources in the $W_2$ codebook can be wideband and the selection of DFT beams per CSI-RS resource can be subband. In such case a 2-bit subband beam selection and 2-bit wideband resource selection may be used for $W_2$ reporting instead of a 4-bits joint report of the resource and beam selection.

Figure 9:
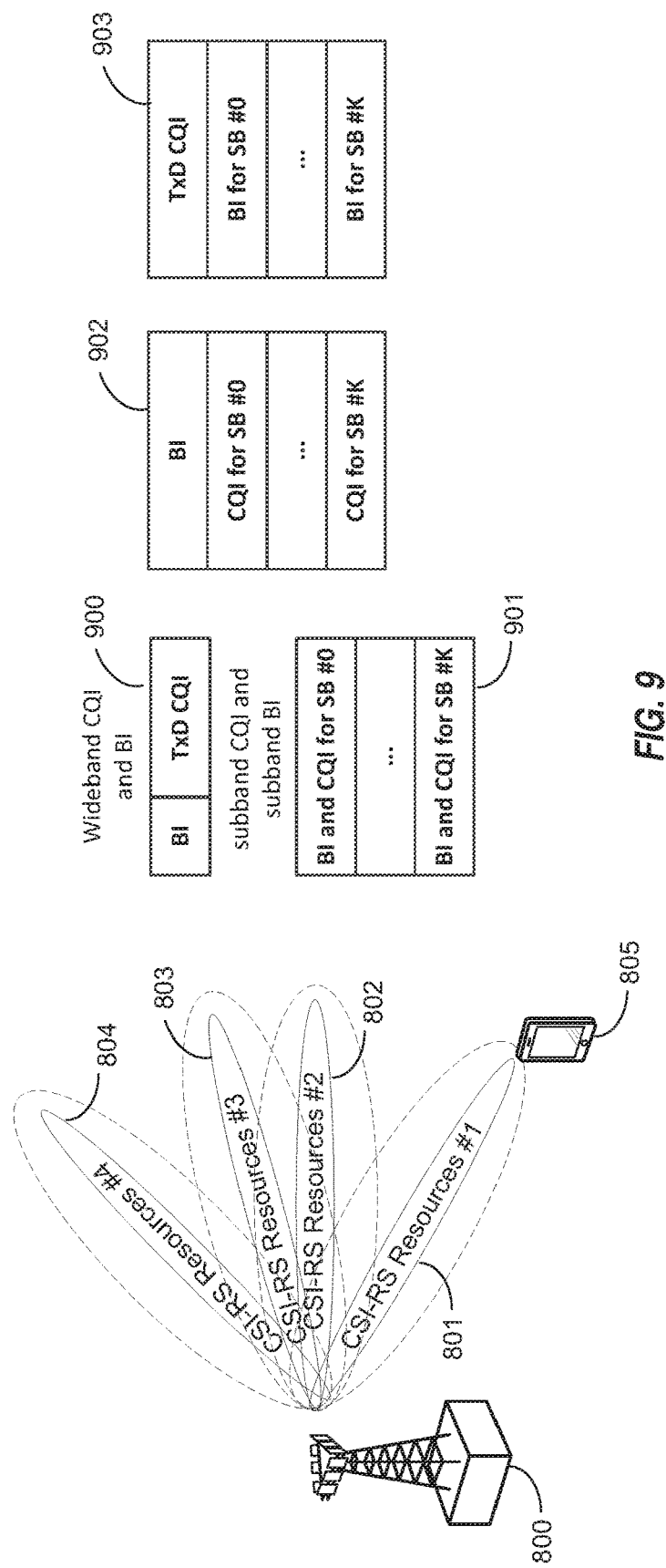
FIG. 9 is a block diagram illustrating a base station and a UE configured according to one aspect of the present disclosure.

FIG. 9 is a block diagram illustrating base station 800 and UE 805 configured according to one aspect of the present disclosure. The various aspects of the present disclosure may support transmit diversity (TxD) channel quality indicator (CQI) reporting or CQI-only reporting for beamformed CSI-RS when UE 805 is configured with a single CSI process with multiple beamformed CSI-RS resources, such as CSI-RS resources 801-804, and the number of CSI-RS ports associated with each resource is equal to 2 or 4. TxD CQI reporting may be based on a single CSI-RS resource or multiple CSI-RS resources. Reporting of a subband beam index (BI) may be implemented if multiple CSI-RS resources are selected. Therefore, there may be at least four TxD CQI report modes for beamformed CSI-RS, e.g., wideband TxD CQI and wideband BI 900: subband TxD CQI and wideband BI 902; wideband TxD CQI and subband BI 903; and subband TxD CQI and subband BI 901. UE 604 would measure the channel quality of CSI-RS resources 801-804 and select the best resources based on the measurements. Depending on the mode of reporting, UE 604 would transmit wideband and/or subband CQI and BI to base station 800.

Figure 10:
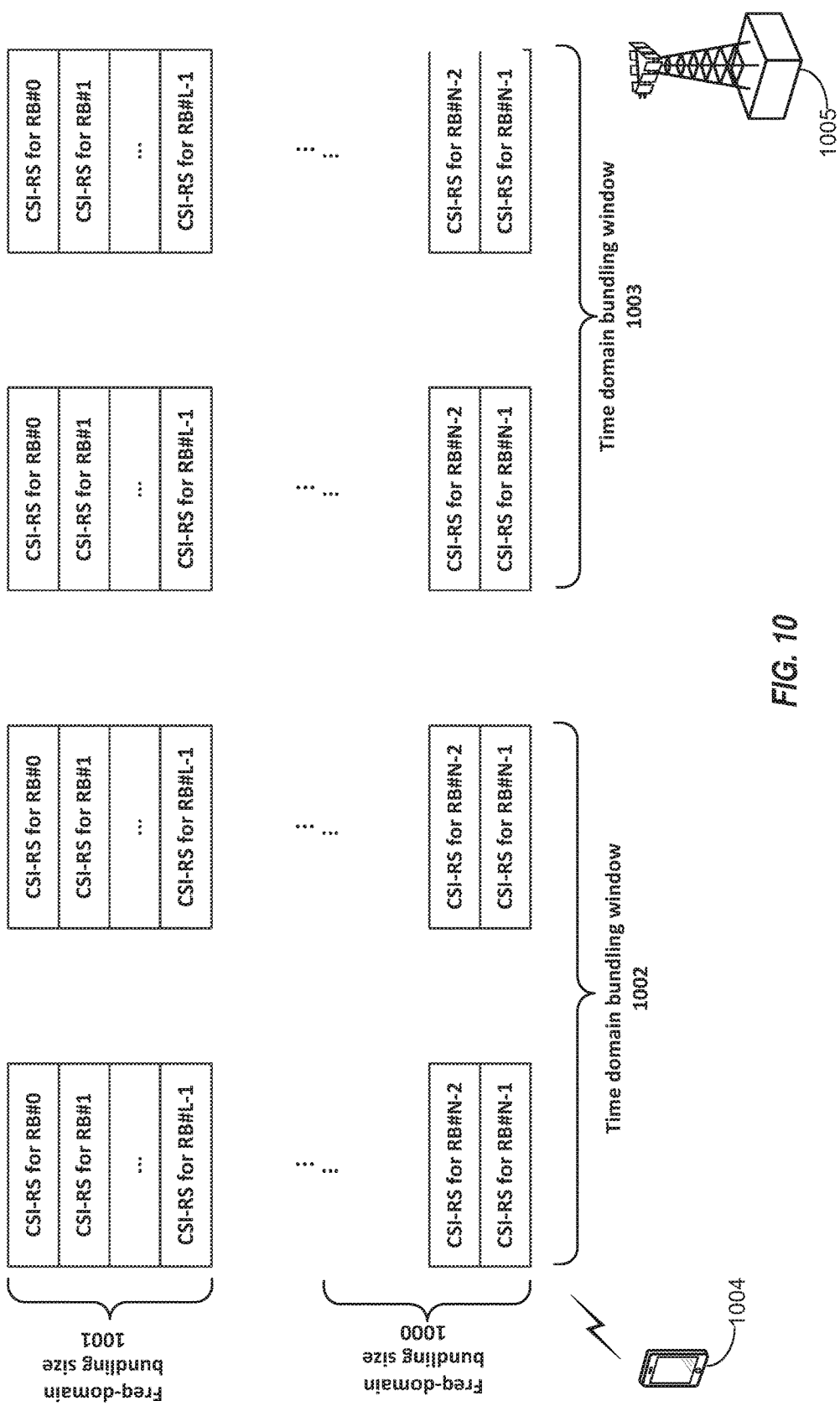
FIG. 10 is a block diagram illustrating a UE and a base station configured according to one aspect of the present disclosure.

FIG. 10 is a block diagram illustrating a UE 1004 and a base station 1005 configured according to one aspect of the present disclosure. For beamformed CSI-RS, it may be possible that the CSI-RS beamforming weight is adapted on the frequency/time domain based on UE channel measurement and load distribution in the cell. In other words, CSI-RS precoding bundling may be supported on both the frequency domain and time domain. On the frequency domain 1000 and 1001, the bundling size can be either equal to subband size for CSI feedback, fixed, dependent on system bandwidth, or semi-statically configured by higher layer signaling. On the time domain 1002 and 1003, the bundling window may either be configurable with a fixed periodicity or aperiodic based on L1 signaling. UE 1004 may also be configured whether CSI-RS precoding bundling is used or not for frequency domain or time domain or both.

Figure 11:
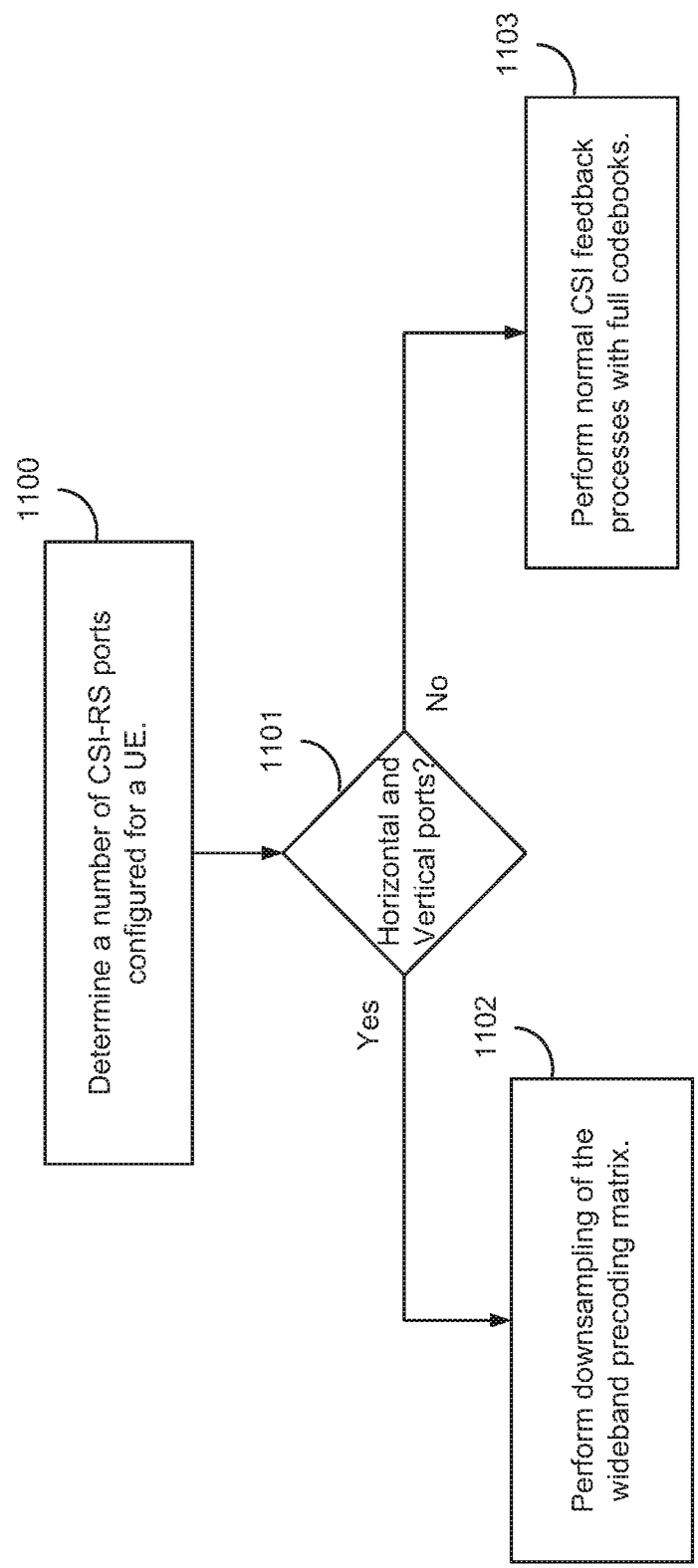
FIG. 11 is a block diagram illustrating example blocks executed to implement one aspect of the present disclosure.

FIG. 11 is a block diagram illustrating example blocks executed to implement one aspect of the present disclosure. In additional aspects of the present disclosure, there could be a modified operation such that the down-sampling of the k-element KP structure beamformer may be triggered or dependent on the CSI-RS processes configured for a UE. For example, at block 1100, the UE determines a number of CSI-RS ports configured for it. A determination is made, at block 1101, whether there are both horizontal and vertical ports configured for the UE. At block 1103, when either only a horizontal port or only a vertical port is configured for the UE, the UE will perform CSI feedback under normal conditions with full precoding matrices. At block 1102, when the determination identifies that both horizontal and vertical ports are configured for the UE, down-sampling of the codebooks is implemented. Such a balanced approach to implementing the down-sampling would provide a good tradeoff between CSI processing or overhead and performance.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 7, and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory. EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM. EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A. B, and C in combination. Also, as used herein, including in the claims, "or" as used in a list of items prefaced by "at least one of" indicates a disjunctive list such that, for example, a list of "at least one of A. B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining a number of channel state information (CSI) processes configured for a user equipment (UE);
   in response to the number of CSI processes being at least two:
   determining a first precoding matrix from a plurality of precoding matrices, wherein the plurality of precoding matrices is constructed by a Kronecker product of a horizontal precoding matrix and a vertical precoding matrix;
   selecting a predetermined number of precoding vectors out of the plurality of precoding matrices of the first precoding matrix;
   generating a wideband precoding matrix, based on the selected predetermined number of precoding vectors; and
   reporting one or more channel state information (CSI) report, wherein the one or more CSI report includes at least one precoding matrix indicator (PMI) for the first precoding matrix and at least an indication of the selection of the predetermined number of precoding vectors.

2. The method of claim 1, wherein the number of CSI processes is at least two, the method further including:
selecting at least four columns of precoding vectors of the first precoding matrix for the wideband precoding matrix, wherein the selecting is based on a predetermined column pair combination.

3. The method of claim 2, wherein the number of CSI processes is at least two, the method further including:
using one of a same or different elevation beamforming for the selected predetermined number of precoding vectors for the wideband precoding matrix.

4. The method of claim 1, wherein the number of CSI processes is at least two, the method further including:
selecting one or more beams out of the wideband precoding matrix for a plurality of layers associated with a plurality of transmissions by a base station;
adjusting a relative phase shift between polarizations of the selected at least two beams for a subband precoding matrix; and
reporting a subband PMI to the base station, where the subband PMI defines selection of one or more beams for constructing the subband precoding matrix for different layers and for different polarizations.

5. An apparatus configured for wireless communication, comprising:
means for determining a number of channel state information (CSI) processes configured for a user equipment (UE);
means, executable in response to the number of CSI processes being at least two:
for determining a first precoding matrix from a plurality of precoding matrices, wherein the plurality of precoding matrices is constructed by a Kronecker product of a horizontal precoding matrix and a vertical precoding matrix;
for selecting a predetermined number of precoding vectors out of the plurality of precoding matrices of the first precoding matrix;
for generating a wideband precoding matrix, based on the selected predetermined number of precoding vectors; and
for reporting one or more channel state information (CSI) report, wherein the one or more CSI report includes at least one precoding matrix indicator (PMI) for the first precoding matrix and at least an indication of the selection of the predetermined number of precoding vectors.

6. The apparatus of claim 5, wherein the number of CSI processes is at least two, the apparatus further including:
means for selecting at least four columns of precoding vectors of the first precoding matrix for the wideband precoding matrix, wherein the means for selecting is based on a predetermined column pair combination.

7. The apparatus of claim 6, wherein the number of CSI processes is at least two, the apparatus further including:
means for using one of a same or different elevation beamforming for the selected predetermined number of precoding vectors for the wideband precoding matrix.

8. The apparatus of claim 5, wherein the number of CSI processes is at least two, the apparatus further including:
means for selecting one or more beams out of the wideband precoding matrix for a plurality of layers associated with a plurality of transmissions by a base station;
means for adjusting a relative phase shift between polarizations of the selected at least two beams for a subband precoding matrix; and
means for reporting a subband PMI to the base station, where the subband PMI defines selection of one or more beams for constructing the subband precoding matrix for different layers and for different polarizations.

9. A non-transitory computer-readable medium having program code recorded thereon, the program code comprising:
program code for causing a computer to determine a number of channel state information (CSI) processes configured for a user equipment (UE);
program code, executable in response to the number of CSI processes being at least two:
for causing the computer to determine a first precoding matrix from a plurality of precoding matrices, wherein the plurality of precoding matrices is constructed by a Kronecker product of a horizontal precoding matrix and a vertical precoding matrix;
for causing the computer to select a predetermined number of precoding vectors out of the plurality of precoding matrices of the first precoding matrix;
for causing the computer to generate a wideband precoding matrix, based on the selected predetermined number of precoding vectors; and
for causing the computer to report one or more channel state information (CSI) report, wherein the one or more CSI report includes at least one precoding matrix indicator (PMI) for the first precoding matrix and at least an indication of the selection of the predetermined number of precoding vectors.

10. The non-transitory computer-readable medium of claim 9, wherein the number of CSI processes is at least two, the program code further including:
program code for causing the computer to select at least four columns of precoding vectors of the first precoding matrix for the wideband precoding matrix, wherein the program code for causing the computer to select is based on a predetermined column pair combination.

11. The non-transitory computer-readable medium of claim 10, wherein the number of CSI processes is at least two, the program code further including:
program code for causing the computer to use one of a same or different elevation beamforming for the selected predetermined number of precoding vectors for the wideband precoding matrix.

12. The non-transitory computer-readable medium of claim 9, wherein the number of CSI processes is at least two, the program code further including:
program code for causing the computer to select one or more beams out of the wideband precoding matrix for a plurality of layers associated with a plurality of transmissions by a base station;
program code for causing the computer to adjust a relative phase shift between polarizations of the selected at least two beams for a subband precoding matrix; and
program code for causing the computer to report a subband PMI to the base station, where the subband PMI defines selection of one or more beams for constructing the subband precoding matrix for different layers and for different polarizations.

13. An apparatus configured for wireless communication, the apparatus comprising:
- at least one processor; and
- a memory coupled to the at least one processor,
- wherein the at least one processor is configured:
  - to determine a number of channel state information (CSI) processes configured for a user equipment (UE);
- in response to the number of CSI processes being at least two, the at least one processor is further configured:
  - to determine a first precoding matrix from a plurality of precoding matrices, wherein the plurality of precoding matrices is constructed by a Kronecker product of a horizontal precoding matrix and a vertical precoding matrix;
  - to select a predetermined number of precoding vectors out of the plurality of precoding matrices of the first precoding matrix;
  - to generate a wideband precoding matrix, based on the selected predetermined number of precoding vectors; and
  - to report one or more channel state information (CSI) report, wherein the one or more CSI report includes at least one precoding matrix indicator (PMI) for the first precoding matrix and at least an indication of the selection of the predetermined number of precoding vectors.

14. The apparatus of claim 13, wherein the number of CSI processes is at least two, the apparatus further including configuration of the at least one processor to select at least four columns of precoding vectors of the first precoding matrix for the wideband precoding matrix, wherein the selection is based on a predetermined column pair combination.

15. The apparatus of claim 14, wherein the number of CSI processes is at least two, the apparatus further including configuration of the at least one processor to use one of a same or different elevation beamforming for the selected predetermined number of precoding vectors for the wideband precoding matrix.

16. The apparatus of claim 13, wherein the number of CSI processes is at least two, the apparatus further including configuration of the at least one processor:
- to select one or more beams out of the wideband precoding matrix for a plurality of layers associated with a plurality of transmissions by a base station;
- to adjust a relative phase shift between polarizations of the selected at least two beams for a subband precoding matrix; and
- to report a subband PMI to the base station, where the subband PMI defines selection of one or more beams for constructing the subband precoding matrix for different layers and for different polarizations.

* * * * *